US012030069B2

(12) United States Patent
Knight et al.

(10) Patent No.: US 12,030,069 B2
(45) Date of Patent: Jul. 9, 2024

(54) DISPENSER PUMPS AND DISPENSERS

(71) Applicant: RIEKE PACKAGING SYSTEMS LIMITED, Leicestershire (GB)

(72) Inventors: Simon Christopher Knight, Bridgend (GB); Gaurang Mittal, Uttar Pradesh (IN); Ashish Singh, Uttar Pradesh (IN); Pratham Pal, Uttar Pradesh (IN)

(73) Assignee: RIEKE PACKAGING SYSTEMS LIMITED (GB)

( * ) Notice: Subject to any disclaimer, the term of this patent is extended or adjusted under 35 U.S.C. 154(b) by 144 days.

(21) Appl. No.: 17/887,774

(22) Filed: Aug. 15, 2022

(65) Prior Publication Data

US 2023/0036689 A1 Feb. 2, 2023

Related U.S. Application Data

(63) Continuation of application No. 17/208,275, filed on Mar. 22, 2021, now Pat. No. 11,413,638, which is a (Continued)

(30) Foreign Application Priority Data

May 25, 2017 (IN) ............................ 201741018391

(51) Int. Cl.
*B05B 11/00* (2023.01)
*B05B 11/10* (2023.01)

(52) U.S. Cl.
CPC ........ *B05B 11/106* (2023.01); *B05B 11/0044* (2018.08); *B05B 11/1001* (2023.01)

(58) Field of Classification Search
CPC ............... B05B 11/106; B05B 11/0044; B05B 11/1001; B05B 11/0062; B05B 11/1047; B05B 11/1067
(Continued)

(56) References Cited

U.S. PATENT DOCUMENTS 3,228,347 A 1/1966 Corsette
4,340,158 A 7/1982 Ford
(Continued)

FOREIGN PATENT DOCUMENTS

DE 102016105999 3/2017
DE 102016106017 4/2017
(Continued)

OTHER PUBLICATIONS

Patent Cooperation Treaty (PCT), International Search Report and Written Opinion for Application PCT/EP2018/063838 filed May 25, 2018 mailed Aug. 20, 2018, International Searching Authority, EP.

*Primary Examiner* — Vishal Pancholi
(74) *Attorney, Agent, or Firm* — McDonald Hopkins LLC

(57) ABSTRACT

A dispenser pump has a plunger operable in a body including an outer cylinder body having a vent opening in its sidewall and a body insert fitting into the top of the outer body and providing an external collar through which the plunger stem operates. The body insert has lock-down threads to lock down the plunger for shipping. The insert also has formations for blocking or unblocking the vent opening by rotation between the outer body and body insert, driven by rotation of the plunger head which makes a catch engagement with the top of the body insert. This plunger head rotation is the locking or unlocking action for the plunger lock-down. Blocking the vent during shipping reduces leakage.

20 Claims, 2 Drawing Sheets

Related U.S. Application Data continuation of application No. 16/615,907, filed as application No. PCT/EP2018/063838 on May 25, 2018, now Pat. No. 10,953,421.

(58) Field of Classification Search
USPC ........................................................ 222/153.1
See application file for complete search history.

(56) References Cited

U.S. PATENT DOCUMENTS

| | | | |
|---|---|---|---|
| 5,016,780 | A | 5/1991 | Moretti |
| 5,549,223 | A | 8/1996 | Hori |
| 6,006,949 | A | 12/1999 | Foster et al. |
| 6,230,942 | B1 | 5/2001 | Kuo |
| 8,403,181 | B2 | 3/2013 | Ding |
| 2012/0024909 | A1 | 2/2012 | Carta |

FOREIGN PATENT DOCUMENTS

| | | |
|---|---|---|
| EP | 0105000 | 4/1984 |
| EP | 1561512 | 8/2005 |
| EP | 2338607 | 6/2011 |
| GB | 2079384 | 1/1982 |
| WO | 1999035079 | 7/1999 |

DISPENSER PUMPS AND DISPENSERS

CROSS-REFERENCE TO RELATED APPLICATION

This application is a continuation of U.S. patent application Ser. No. 17/208,275, entitled "DISPENSER PUMPS AND DISPENSERS," filed on Mar. 22, 2021 which is a continuation of U.S. patent application Ser. No. 16/615,907, entitled "DISPENSER PUMPS AND DISPENSERS," filed on Nov. 22, 2019, now U.S. Pat. No. 10,953,421; which is a 371 U.S.C. national stage filing of International Patent Application No. PCT/EP2018/063838 filed on May 4, 2018; which claims priority to Indian Patent Application No. 201741018391 filed on May 25, 2017, each of which are incorporated by reference in their entireties.

FIELD OF THE INVENTION

This invention has to do with dispensers for liquid products, of the type in which a pump usually consisting essentially of moulded plastics components is mounted on the neck of a container of a liquid to be dispensed, and dispenses the liquid by an action in which a plunger of the pump is moved relative to a body of the pump. Such dispensers are widely used e.g. for dispensing soaps, cosmetics, toiletries, medical creams, lotions and the like.

BACKGROUND

Generally, pumps of the kind to which the present proposals relate have a pump body with an inlet to a pump chamber and an outlet passage from the pump chamber to an outlet opening. An inlet check valve assures directional flow, and usually an outlet valve is provided for adequate priming and re-fill of the pump chamber. The pump chamber is varied in volume by movement of the plunger, and usually is defined between a piston and cylinder; typically the piston is carried by the plunger and wipes the inside of a cylinder which is part of the pump body. The simplest, and hence most economical and popular, designs have the outlet passage through the plunger and that is the preferred type here. Preferably a pump spring biases the plunger to an extended position (up-position) relative to the body, at maximum pump chamber volume. The user depresses the plunger against this spring to reduce the pump chamber volume, close the inlet valve and drive product out through the outlet passage. In this description we describe pumps as with the plunger movement axis upright and the plunger at the top of the body (the position of full depression of the plunger then being the down-position), for ease of description and because it is preferred and normal, but the skilled person will understand that other orientations are possible. The terminology is relative and not absolute.

It is well-known to enable locking of the plunger axially relative to the body, especially for shipping purposes for which the locked-down position is more compact. Usually lock-down is by depressing and then turning the plunger, bringing interlock formations such as screw threads or lugs/slots into engagement. Other pumps provide for locking-up at full extension, preventing depression of the plunger. This may be e.g. for aesthetic reasons, or to avoid dispensing an unwanted dose by pushing the plunger down before locking. Some pumps provide for both up-locking and down-locking.

In general, pump dispensers nowadays are required to withstand more and more demanding shipping and transit conditions, including sending individually e.g. as mail packages. Shaking, inversion, impact and temperature changes can provoke leakage, either through small clearances and tolerances in the pump structure or by accidental detachment, damage or unlocking of the components.

A further requirement in pump dispensers of the kind described is the venting of outside air into the container interior, to compensate for the volume of product dispensed and to allow for adjustment flow during temperature or pressure changes, avoiding unsightly "panelling" (partial collapse) of the container. The sealed join between the pump body and the container—typically a seal between a flange on a cylinder body of the pump and the container neck—divides an exterior region from an interior region, and the vent must communicate between these while minimising leakage.

Conventional vent paths enter between the movable plunger stem and the external surround or collar of the pump body or, where the latter is a discrete component, sometimes between this and the main pump body cylinder. A vent opening (usually a simple small hole) is formed through the cylinder wall to communicate with the container interior and complete the vent path. The vent hole in the cylinder wall is often aligned with the position of the pump piston so that, in the rest condition with the plunger up, the piston blocks the vent path to minimise accidental leakage. The vent opens when the pump is used.

However as mentioned many pumps provide for locking the plunger in a down or retracted position, blocking the main dispensing pathway and giving a compact format, but leaving the vent hole open to leakage of product into the cylinder above the piston during shipping. Such product can drain back out through the vent hole (often two opposed vent holes are provided to promote this) when the dispenser is put into use, but there is still an issue that, when the plunger head is initially unlocked and rises, some liquid which has leaked to above the piston is carried up or leaks through the body opening around the plunger stem, causing mess and annoyance. It is known to provide a valve sleeve or washer for the vent to prevent this, but this extra component is undesirable.

THE INVENTION

In these proposals we put forward new features of dispensers and dispenser pumps of the kind described, with a view to addressing the above issues.

Specific novel proposals are now described in general terms. While each of them individually can provide novel and useful operation of an individual part of a pump or dispenser, they also work in concert and are proposed herein in any compatible combination.

A first aspect of our proposals relates to dispenser pumps, and pump dispensers comprising such pumps mounted on containers, with measures for reducing or avoiding a tendency to leakage through the vent path. The pump has a plunger and a body, and the body comprises an outer or main body, generally including the cylinder of the pump, and a body insert portion through which the stem of the plunger extends. The plunger has a head and a piston, and is rotatable relative to the body between axially locked and axially unlocked positions, in particular having a locked-down position in which the plunger is held relatively retracted into the body (the other extreme being the extended or "up" position, which may also have a lock). The locking is by the inter-engagement of locking formations of the plunger—especially on the stem and/or on the underside of a head thereof—and of the body, typically formed on a body insert thereof and which may be either recessed inside the insert or exposed at its exterior. These locking formations are commonly in the form of threads or thread segments, or similar cam forms, or retaining flanges or slots to which access of corresponding projections on the other component is selective according to the rotational alignment thereof so that the plunger can be turned between locked and released positions. This is all in itself well-known. The movement to turn the plunger from the locked condition to the unlocked condition is called the unlocking rotation herein (while understanding that it may also entail an axial movement component, when inclined formations such as threads are used).

According to our proposal, the body insert, or at least a portion thereof, is movable relative to the outer body between positions in which a vent path, defined between the components and typically including a hole through a wall of the outer body, is respectively blocked and open. For this purpose, the body insert may have a vent-blocking portion which engages the outer body in the locked condition to block the vent path, and is disengaged from the outer body in the unlocked condition to open the vent path, e.g. by bringing a recess or relative clearance into register with a vent opening of the outer body, or by retracting a blocking portion of the body insert e.g. axially or radially, relative to the outer body.

Preferably the body insert is rotatable relative to the outer body between the vent-blocked and vent-open positions. Such rotation may be drivable by engagement between the plunger and the outer body or the body insert, preferably the body insert (since the outer body desirably remains fixed relative to the associated container neck, to define a reaction structure).

The body insert and outer body may comprise structures defining respective limit formations, such as stop abutments, which are engageable to limit or define a range of relative movement between the two components, especially relative rotation, and in particular so as to define one or more limit or stop positions corresponding to a relative orientation assuring the vent-blocked alignment and/or to a relative orientation assuring the vent-open alignment. Respective limit formations may define a predetermined available angle or sector of relative movement for operating the vent block/unblock function.

As mentioned, the plunger desirably engages the body insert to drive its movement for the vent blocking function, especially a rotational movement through a predetermined angle or sector, and/or movement between or up to one or more limit stop engagements. Formations of the plunger (usually on the stem and/or head thereof) desirably engage the body insert to turn it. The engagement may be selectively available at one or a few relative rotational alignments, e.g. corresponding to a fully locked condition (with reference to the mentioned locking formations), such as a position at which the plunger is fully screwed down into or onto a lock-down thread of the body insert. Such catch engagements are useful to protect the pump against accidental unlocking, e.g. during shipping: see our WO2016/009187 for a range of proposals which may be used herein, and the contents of which are incorporated herein by reference.

In preferred embodiments, a flexible rib, fin, lug or other projection on one component—preferably at or on the underside of the plunger head—is engageable by riding over a ramp to a position behind a shoulder abutment of the other component (such as on an upwardly-directed surface of the body insert, e.g. on an external collar portion thereof) so that it "clicks" into place when sufficiently tightened (by the rib deforming as it rides up the ramp). It can then strongly resist initial turning in the opposite direction because of the steeper abutment. To unlock, rotation force on the plunger must reach a threshold level to escape past the abutment and overcome the catch engagement. Desirably, in the invention, the relative movement e.g. rotation between the body insert and outer body, operates at a turning force less than this threshold level, so that turning of the plunger drives the relative movement (to block or unblock the vent). Limit or stop engagements between the body insert and outer body can then prevent further movement so that the threshold force can be exceeded, the catch disengaged and the plunger turns relative to the body insert (for unlocking or locking): the locking formations are usually comprised in the body insert).

Alternatively stated, there is lost rotational motion between the plunger and the body insert, such as a mentioned sector of actuation for the vent blocking/unblocking being substantially less than a sector of actuation for the plunger locking/unlocking relative to the outer body. The former may be e.g. less than 60% or less than 50% of the latter. The relative rotation of head/outer body for locking/unlocking may be e.g. from 180 to 360 degrees, whereas that between the body insert and the body for vent blocking/unblocking may be e.g. from 40 to 100 degrees. The skilled person will appreciate that these angles are just illustrative, not fundamental, and can be adjusted according to the vent formations used and the body geometry.

It is preferred that the mechanism is reversible, so that rotation of the plunger in the locking sense can also move the body insert relative to the outer body from the vent-open to the vent-blocked condition, as well as the unlocking rotation moving them from the vent-blocked to the vent-open condition as already described. It is within the scope of these proposals that only one of these functions is provided, desirably at least the unlocking movement that unblocks the vent is provided. Such a single functionality might be by the plunger head engaging the body insert only in one rotational sense, or by appropriate limit abutments between the body insert and outer body being provided only for one direction of relative rotation.

A vent opening may be a hole through a wall, especially a cylinder wall, of the outer body. It may be radially directed or partly radially directed. It may open inwardly through a surface of the outer body which makes contact, especially sliding contact, with a vent-blocking portion of the body insert.

Incidentally it is well known for a cylinder wall vent to be at a wall region overlapped—on the inside—by a downwardly-projecting skirt portion of a body insert. However in conventional pumps there is clearance between the components, so that the vent is always open. In the present invention, such a structure may be adopted but additionally providing a contacting (vent-blocking) portion on the body insert at a selected angular location in axial register with the vent opening, so that turning the insert relative to the outer body can slides the contacting portion—which may be in the form of a land or surround wall or barrier formation—to cover and block the vent opening.

Preferably more than one vent is provided, e.g. two vents at opposed positions.

In a preferred embodiment the outer body comprises a cylinder portion, a locating flange which engages the container neck in use (and desirably incorporates formations for making an interlock with the neck to prevent rotation), and an upstanding tubular top retaining formation, which may project up through the opening of a securing ring or securing cap used to hold the body flange down onto the container neck, and onto/into which the body insert is secured, but so as to be relatively rotatable e.g. by snap ribs or the like. The body insert may then include an insert portion extending down below the body flange and overlapping a region having the one or more vent openings of the body, and provided with one or more vent-blocking formations—which block the vent when aligned with it—and/or one or more relief or recessed areas which, when aligned with the vent, leave it open. Additionally, the body and body insert comprise respective stop formations defining a restricted range of relative rotation between the components. Projections formed on the inside of the upstanding top portion of the outer body and on the outside of the insert portion of the body insert are suitable. These formations may be repeated e.g. duplicated around the structure.

While a rotational and sliding unblocking action is convenient and preferred, it is not the only option. In particular, because down-locking often also entails a relative axial movement driven by a thread, a corresponding relative blocking/unblocking movement may be axial. It may be an axial slide. Or, a portion of the plunger may either turn or push downwardly in interfering engagement with an inwardly-directed portion of the body insert, which is thereby deformed outwardly to block the vent of the outer body. For example a body portion of the body insert may be pushed by a portion of the plunger to bulge outwardly and block a vent hole through a cylinder wall of the outer body.

A further aspect of the present proposals is a plunger-body catch structure which is a preferred feature in the above vent-control invention, but also an independent proposal in its own right. The underside of the plunger head has a projecting deformable fin. The top of the body, such as the exposed top of a body insert of the structure as described above, is formed with a circular depression, e.g. a generally conical depression defining an annular path around which an engaging edge of the fin moves when the plunger is turned relative to the body. A lock-down function is provided, as already discussed. The fin edge is angled up and out, to complement the shape of the body depression track that it engages in the retracted position. A generally radially-extending abutment or shoulder is provided at a selected circumferential location on the track, in a catch formation having a sloping ramp on one side and a relatively abrupt or perpendicular (circumferentially-directed) face on the other side. As the plunger is turned to the locked-down position, the operating edge of the rib rides up the ramp, with deformation of the rib or structure behind it, the rib then clicking down behind the abutment to act as a catch inhibiting accidental release from the locked position. Provision of a depressed or dished formation at the top of the pump body is aesthetically desirable and helps to guide spills or drips back down into the dispenser. The catch formations may be repeated e.g. duplicated at positions spaced around the body and plunger, e.g. with diametrically-opposed shoulders on the body and diametrically-opposed catch ribs on the underside of the plunger head.

When used with the first aspect herein, the formations may be made bi-directional, i.e. a corresponding abutment and ramp may be provided facing the first-mentioned abutment and oppositely-directed—effectively creating a slot between the two abutments—so that the plunger when engaged in the slot is effective to drive turning of the body (or body insert, in that case) for either of the blocking or unblocking of the vent.

General Dispenser Features

The primary features of pump dispensers of the kind which the invention relates have already been described above. Typically the pump or pump module is a discrete module connected to a container neck, with all or part of the pump body projecting down inside the container interior.

The pump module may comprise a closure portion which engages around the neck to close it so that liquid outflow is through the pump, and engages it to hold the pump module and container together. The body normally also comprises a cylinder portion, with a cylinder wall and inlet formation to provide a pump chamber in cooperation with a piston of the plunger. A cylinder portion and closure portion may be formed in one piece, as a cylinder/closure component ("cylinder body" for short). Usually a discrete outer securing cap is provided, adapted to fix down onto the container neck e.g. by a thread or snap engagement, to hold the body in place, having an opening through which the plunger projects, and optionally a top portion of the pump body too such as of a cylinder or collar described herein.

The pump body may have internal features inside the cylinder portion to provide various features, and for this it is usually necessary to provide a discrete insert component fitting into the cylinder portion from above, because of moulding constraints.

The pump body may have a collar portion around where the plunger emerges from an opening of the body, providing one or more functions such as sealing, locking and the like between the body and plunger at the exterior. This collar will usually overlap the interior void of the cylinder portion so that again, because of moulding constraints, it is often made as a discrete component fixed to the cylinder portion or closure portion. In preferred embodiments herein an insert portion or collar portion are combined in a single collar/insert component ("body insert" for short, as used in the first aspect) part of which (insert) extends down inside the cylinder portion, part of which (collar) is above at the pump exterior.

The insert portion or combined body insert may for example have formations providing any one or more of uplocking and/or downlocking in relation to a stem of a plunger, a seat for a pump spring, and one or more seals to engage the plunger as discussed later. Usually it is fixed axially into the body cylinder portion or closure portion e.g. by a snap fit.

The inlet valve may be of any kind, but typically is a ball valve. The inlet may have a dip tube fitting e.g. socket, holding a dip tube which extends down into the container interior.

Typically the plunger is of the kind incorporating the outlet passage and outlet opening, i.e. a "moveable nozzle" pump. Usually the plunger has a head on which the user presses and where the outlet opening is provided (e.g. at the end of a laterally-projecting nozzle), a stem projecting axially down from the head into the pump body through an opening thereof, and a piston on the stem engaging the wall of the cylinder portion with a pump seal. The lower end of the stem has an entry to the outlet passage below the piston seal, i.e. in the pump chamber, which opens in the downstroke of the plunger. An outlet valve function may be provided by a moveable valve body, e.g. a conventional ball valve in the outlet passage of the plunger. More preferably it is provided by slidable mounting of pump seal/piston on the stem, in which a sleeve mounting of the piston covers or uncovers one or more entry windows to the outlet passage according to the relative position of the piston, which moves up relative to the stem on the downstroke and vice versa.

The cylinder portion of the pump body may have a said vent opening for admitting compensation air into the container, positioned above the pump seal in the down-position, and which may be blocked e.g. by the piston/pump seal, in the up-position.

Preferably most or all of the pump components are made from polypropylene (PP). A flexing seal element, such as a piston pump seal, may be of softer material such as LDPE. The container material is not critical but may be e.g. HDPE.

The volume dispensed per stroke may be any conventional amount, but typically is between 0.5 and 20 ml, more usually between 1 and 10 ml or between 1 and 5 ml.

BRIEF DESCRIPTION OF THE DRAWINGS

Embodiments of our proposals are now described by way of example, with reference to the accompanying drawings in which.

DETAILED DESCRIPTION OF EMBODIMENTS

Figure 2:
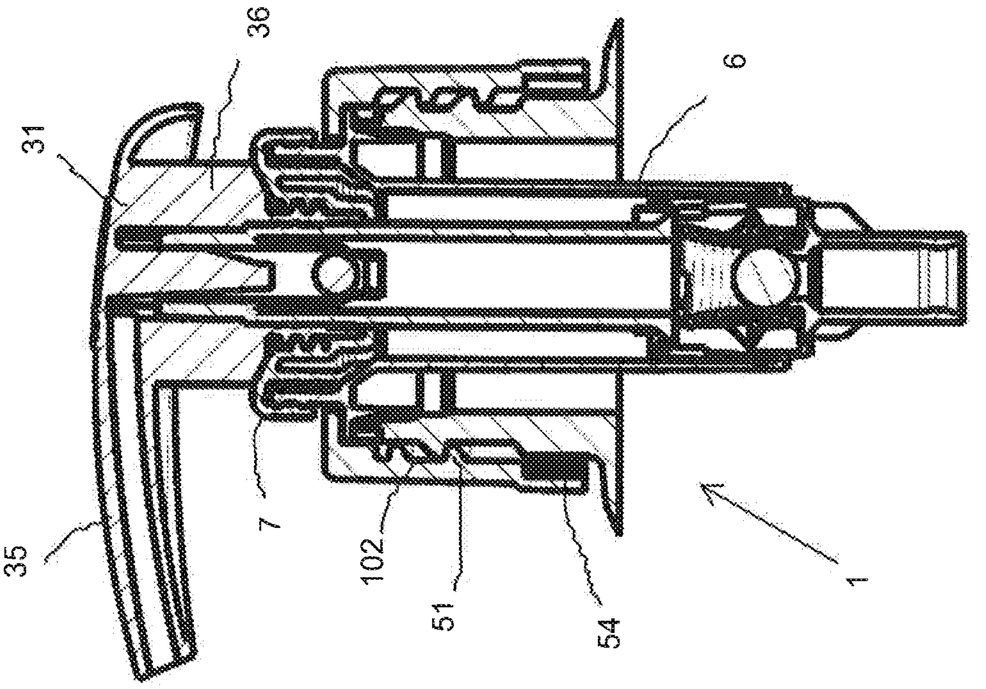
FIG. 2 shows the plunger locked down in the retracted position.
Figure 1:
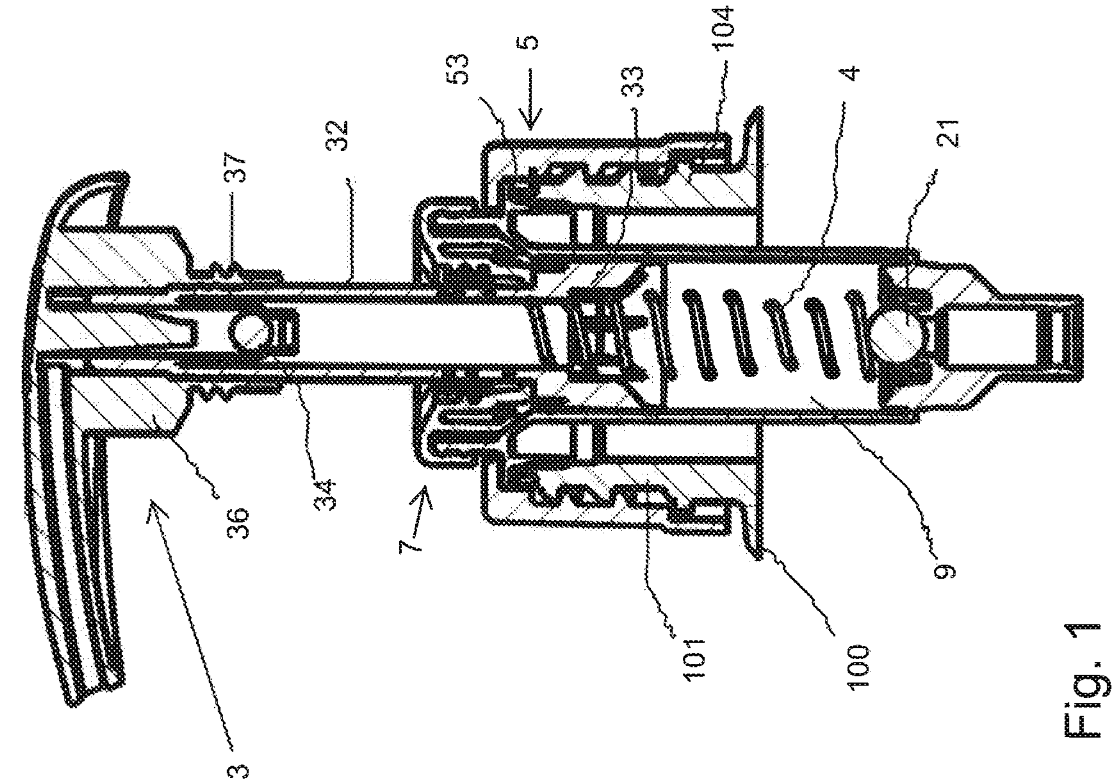
FIG. 1 is an axial cross-section of a dispenser embodying the invention, with much of the container omitted and the plunger in the extended position.

FIGS. 1 and 2 show the general arrangement of a pump dispenser embodying our proposals. The dispenser consists of a pump 1 mounted on the neck 101 of a container 100 (shown only partially) which holds a liquid to be dispensed. The pump has a body 2 mounted fixedly in the neck 101 of the container by a securing cap 5 having an internal thread 51 engaging an external thread 102 of the neck. The pump body consists of an outer body or body cylinder 6 and a body insert or collar 7 fitted into the top of the outer body 6. A plunger 3 has a head 31, a stem 32 and a piston 33 which operates in a cylinder portion 61 of the body cylinder 6, defining therewith a pump chamber 9. A discharge channel is defined through the plunger stem 32, leading to a discharge nozzle 35 of the head 3 by way of an outlet check valve 34. The pump chamber 9 is supplied from the container interior via a dip tube (not shown) and an inlet with an inlet check valve 21, so that reciprocation of the plunger between the extended (up) and retracted (down) positions pumps liquid through the valve and out of the nozzle 35. A pump spring 4 biases the plunger to the extended (up) position.

Figure 7:
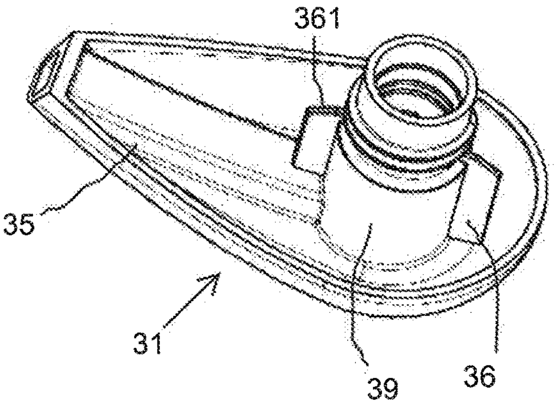
FIG. 7 is a bottom oblique view of a plunger head component.

For shipping or extended periods of non-use the plunger can be locked down as shown in FIG. 2. The plunger head 3 (see also FIG. 7) has a tubular connector portion 39 into which the stem 32 is plugged, with an external lock-down thread 37 and a pair of fins or ribs 36 whose function is described later. The body insert 7 has an inner skirt 72 with a complementary (female) lock-down thread 722. By pushing the plunger 3 down and then turning clockwise to engage the lock-down threads 37, 722, through e.g. about three-quarters of a turn, the plunger can be locked down and in this position the inlet valve 21 is held shut to prevent escape of liquid through the dispensing path.

Figure 3:
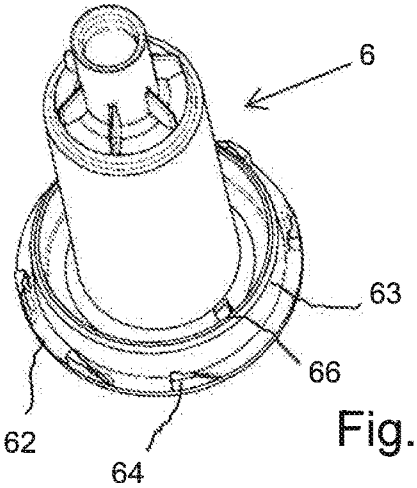
FIG. 3 is an oblique bottom view of a body cylinder component.
Figure 4:
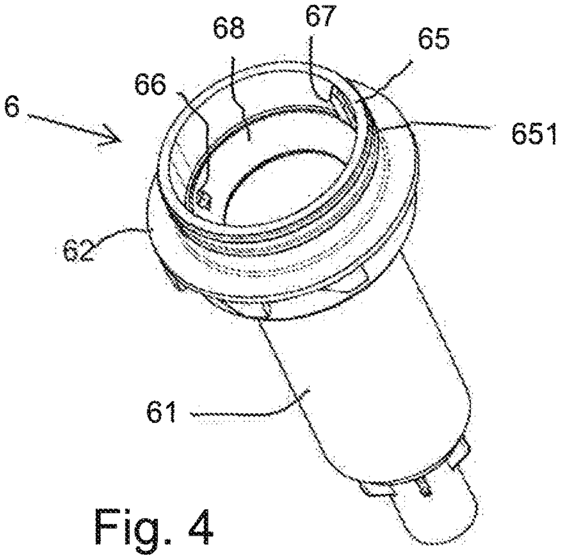
FIG. 4 is a top oblique view of the body cylinder component.
Figure 5:
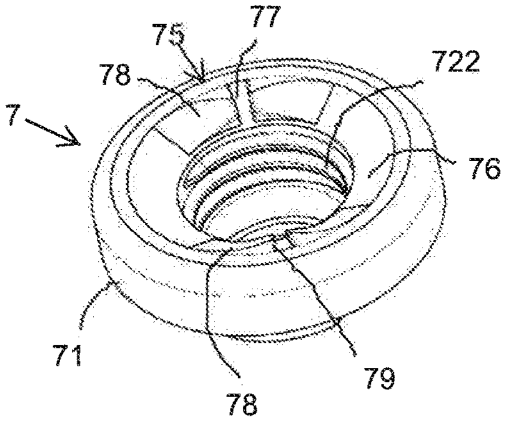
FIG. 5 is a top oblique view of a body insert component.
Figure 6:
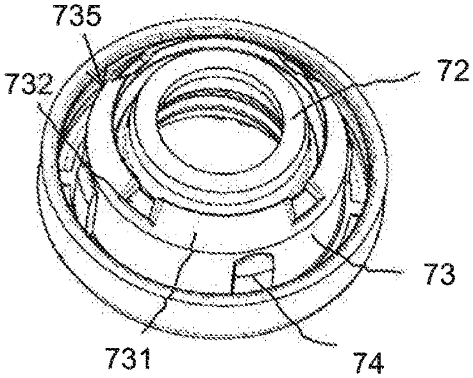
FIG. 6 is a bottom oblique view of the body insert component.
Figure 8:
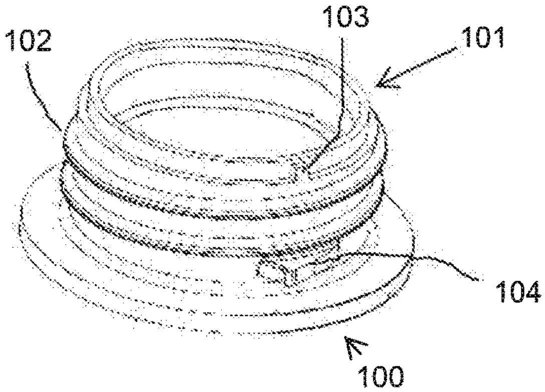
FIG. 8 is a perspective view of a container neck shown separately.

The body cylinder 6 is shown in more detail in FIGS. 3 and 4. It is a one-piece moulding, with the cylinder portion 61 formed integrally with a radial locating flange 62, which rests against the top of the container neck, and an upward annular retainer projection 65 carrying outer snap ribs 651 which engage corresponding inward snap ribs on an outer skirt 71 of the body insert 7. The retaining projection 65 projects up through a central hole of the securing cap 5, the surrounding flange of which presses the body flange 62 down onto the neck edge. In this embodiment the body flange 62 and container neck are specially formed to make an interlock preventing their relative rotation, by means of spaced downward interlock projections 64 from the flange 62, each with a circumferentially-directed abutment face. The container neck 101 (see FIG. 8) has a thinner region adjacent the edge forming an inward step on the outer side, and having a diametrically-opposed pair of body interlock projections 103 formed integrally, at the same thickness as the main thickness of the neck tube (i.e. only as an interruption of the step formation). As explained in our earlier PCT/EP2017/061611, the disclosure of which is incorporated herein by reference, by forming the projections 103 only at the position of a mould split line, or only at positions orthogonal to that line, projections with reliably perpendicular flat faces can be moulded giving a strong interlock at small bulk. Also, they leave a wide clear segment above the step formation into which the downward interlock projections 64 can fit on assembly without specific component alignment being needed. Plural interlock formations 64 are provided (six in this embodiment, as two evenly-spaced sets of three each) to reduce the angle turned between the components before a fixed position is reached. The projections 64 lie close in against the neck edge, and an inwardly prominent retaining band region 53 around the interior of the cap 5 surrounds them closely in the assembled condition (FIGS. 1 and 2) so that the projections 64 cannot bend outwardly out of engagement. This mechanism prevents the outer body/body cylinder 6 from rotating relative to the neck. For further security, in this embodiment the neck is formed with a pair of directional cap interlock projections 104 (see FIGS. 1 and 8) engaged by inwardly-directed pawls or directional teeth 54 around the bottom of the cap 5 to prevent accidental unscrewing of the cap.

Inwardly of the interlock projections 64 a flexible plug skirt 63 projects down from the flange 62: this fits with interference inside the container neck edge to make a seal, obviating the conventional seal washer used here.

Around the inside of the upstanding retaining projection 65 of the body cylinder 6 is a series of spaced limit stops 67, four in this embodiment, presenting abrupt circumferentially-directed faces.

Below the locating flange 62 the cylinder portion 62 has a downwardly converging region 68 of the upper wall through which a pair of vent holes 66 are formed, through which air from the exterior can pass to the container interior around the plunger stem during operation (or in some embodiments between the retainer projection 65 and body insert skirts, e.g. through grooves provided for this purpose). This mode of venting is known in itself. The vent holes are exposed to the container interior, so the potential exists for liquid product to penetrate the pump cylinder above the piston 33 and perhaps escape through the top body opening and/or accumulate in the cylinder 6 above the piston. In either case, such liquid might undesirably emerge from the top of the pump such as when the plunger is unlocked after transit.

To prevent this, the pump is provided with a vent blocking/unblocking mechanism and function as follows. As mentioned, the vent holes 66 are formed through the convergent upper wall 68 of the body cylinder 6 which provides a generally conical annular inner surface. The body insert 7 has a vent control skirt 73, projecting downwardly between the inner and outer skirts 72, 71 mentioned above, which has a vent control surface 735 of conical form generally complementing that of the body wall 68, and contacting it. The vent control surface is characterised by a set of lands 731, each of a smooth conical segment form, which will fit closely against the body wall 68 and block a vent opening 66 if opposed to it. Between the lands are recesses or notches 732 which open downwardly so that, when brought into opposition to a vent opening 66, the vent opening communicates into the upper cylinder space so that the vent path is open. The outside of this vent control skirt 73 also carries a set of four limit stops 74 which, as can be seen, will fit between and interact with those on the inside of the cylinder retainer projection 65 so that with the components inserted and snapped together, the insert 7 is limited to a rotation arc or sector of slightly less than 90 degrees relative to the outer body 6, but can be turned between these limits by overcoming the modest sliding friction at the snap joint. At the anti-clockwise limit of the body insert (seen from above) the vent is closed, while at the clockwise limit the vent is open since the limit stops 67, 74 accurately position the recesses 732 over the vent holes 66.

Next, the role of the plunger 3 is described.

The top face of the body insert 7 interacts with the underside of the plunger head 31 to constitute a plunger catch mechanism which inhibits initiation of the unlocking (anti-clockwise) movement of the plunger head e.g. when subject to impacts in transit. The top face of the body insert 7 has a generally conical indentation, with a conical track 76 interrupted by two retaining formations 75. There could be only one retaining formation, or more than two, but two is convenient and effective for obvious reasons. Each retaining formation 75 consists of a generally radial slot 77 whose bottom is level with the conical track 76, bordered to either side by a circumferentially-directed abutment face 79, from which a ramp 78 extends down in either direction to join the level of the conical track 76.

The downward edges 361 of the ribs or fins 36, formed solidly with the plunger head's connector portion 39, are inclined up and out to conform with the conical track surface 76, and so that as the plunger is being turned to lock it down, they come into engagement with that surface. Approaching the fully locked-down position, the ribs ride up a corresponding pair of the ramps 78 (the opposed pair which rise in the anti-clockwise direction), forcing some resilient bending thereof, and then drop or click down into the slot 77, recovering from the bending. From this position, a substantial threshold turning force is required to push the fins 36 past the abutments 79 and initiate unscrewing of the down-lock threads. By providing the catch mechanism and formations in a recessed surface of the body top, a compact and concealed mechanism is achieved. The oppositely-directed abutment 79 and ramp 78 provide that for tightening (clockwise) turning of the plunger head a similar threshold force must be overcome for head rotation to release co-rotation of the body insert 7.

The threshold force to overcome the catch mechanism is substantially greater than the force required to turn the body insert 7 in the body cylinder 6.

The operation of the features can now be understood. When the dispenser is assembled on the production line, the plunger is depressed and turned clockwise to lock it down. On or soon after its initial engagement with the body insert 7, the ribs 36 of the plunger head carry the body insert 7 around, rotating it relative to the outer body 6 (which is held against rotation relative to the neck 101 by the interlock between them). They turn relatively until the limit stops 67, 74 meet, assuring blocking of the vent holes 66. The reaction of the abutted limit stops then easily overcomes the engagement force for the catch mechanism, so that the ribs or fins 36 ride up the ramps 78 with deformation and click into the catch slots 77 (if they have not already done so). The pump is then able to be shipped, sent by mail etc. without leakage through the vent holes.

When the pump is to be used, the user turns the plunger head forcibly anti-clockwise. On initial rotation, the plunger head carries the body insert 7 anti-clockwise with it until the opposite faces of the limit stops 74, 67 meet, preventing further rotation of the insert 7. The insert recesses 732 are then aligned with the vents 66, so that the vents are open and the pump can operate. The abutting of the limit stops overcomes the threshold release force of the plunger head catch, so that continued turning of the head releases the catch and unlocks the down-locked thread engagement, allowing the plunger to rise for use.

The illustrated embodiment has a pump of the kind in which the pump spring is in the pump chamber. The body insert can be of small length, extending only a short distance down into the body. As is well known, some pumps have a longer tubular insert extending down into the outer cylinder, and often housing the spring in the insert (to avoid product contacting the spring). The same principles can be used to block or unblock a vent hole formed through the wall of the outer cylinder using the insert. The vent holes in this case may be formed further down the cylinder wall, because the insert reaches further down. For example, the insert will typically have a plain cylindrical outer surface with a slight clearance from the outer body wall—as is conventional—so that venting proceeds through the hole and the gap between them. However in line with the invention the plain cylindrical surface of the insert can be interrupted by a land or wall formation (however many are required to correspond to the vents provided) which, by turning the insert relative to the outer body, can be brought to cover or block the vent opening in the outer wall in the similar way to that described above.

We claim:

1. A reciprocating pump, attachable to a container neck, the pump comprising:

a plunger having: i) a head with a dispensing nozzle and at least one flexible fin extending along the axis, and ii) a stem extending along the axis and including locking threads disposed on an outer surface of the stem at an upper portion where the stem attaches to the head;

a body having: a) cylinder with a radial flange positioned above a cylindrical body defining a pumping chamber, and b) an annular body insert, coaxially received within the flange and extending axially toward the pumping chamber, including a conically angled upper facing having a slot and cooperating locking threads positioned along an inner facing of an aperture formed in the annular body insert;

a biasing member urging the plunger axially away from the body;

wherein a bottom edge of the fins is angled to conform to an angled surface forming the slot so as to receive and restrain the flexible fin; and wherein the plunger and the body are configured to rotate relative to one another so as to engage the locking threads to the cooperating locking threads in order to prevent the plunger from extending away from the body.

2. The pump of claim 1 wherein a rotational threshold force disengages the locking threads and the cooperating locking threads and a rotational releasing force releases and rotates the flexible fin out of the slot and wherein the fins and the slot are configured so that the rotational threshold force is greater than the rotational releasing force.

3. The pump of claim 1 wherein the slot is defined by a ramp and an abutment, both disposed on the conically angled upper surface and with the ramp positioned to initially engage the flexible fin as the plunger is rotated into a locked down position.

4. The pump of claim 1 wherein the slot is aligned on a radius of the body insert.

5. The pump of claim 1 wherein the upper facing of the body insert slopes inwardly toward a central aperture of the body insert, so as to impart a funnel-shape to the upper facing.

6. The pump of claim 1 wherein an audible click is produced as the fin flexes and engages the slot.

7. The pump of claim 1 wherein the body insert includes one or more notches, with each notch spaced apart smooth conical landing surfaces, formed along a common circumference on an underside of the body insert and wherein the notches communicate with a vent opening when the locking threads and cooperating locking threads are not engaged.

8. The pump of claim 1 wherein cylinder includes a flexible plug skirt coaxially positioned on an underside of the flange.

9. The pump of claim 1 wherein at least one of the body insert and the cylinder include radial projections configured to stop rotation of the body insert relative to the cylinder when the radial projection(s) is engaged.

10. The pump of claim 1 wherein a coupling groove is disposed on an underside of the body insert so as to couple the body insert to the cylinder.

11. A dispensing system including a reciprocating pump attachable to a container, the system comprising:

a container, configured to store a liquid for dispensing, including an opening defined by a neck; and a reciprocating pump, affixed to the neck and configured to reciprocate along an axis, including:

a plunger having: i) a head with a dispensing nozzle and at least one flexible fin extending along the axis, and ii) a stem extending along the axis and including locking threads disposed on an outer surface of the stem at an upper portion where the stem attaches to the head;

a body having: a) cylinder with a radial flange positioned above a cylindrical body defining a pumping chamber, and b) an annular body insert, coaxially received within the flange and extending axially toward the pumping chamber, including a conically angled upper facing having a slot and cooperating locking threads positioned along an inner facing of an aperture formed in the annular body insert;

a biasing member urging the plunger axially away from the body;

wherein a bottom edge of the fins is angled to conform to an angled surface forming the slot so as to receive and restrain the flexible fin; and wherein the plunger and the head are configured to rotate relative to one another so as to engage the locking threads to the cooperating locking threads in order to prevent the plunger from extending away from the body.

12. The dispensing system of claim 11 further comprising a securing cap with a central hole configured to retain the securing cap to the body.

13. The dispensing system of claim 12 wherein the cap includes a retaining band region positioned to rotationally engage projections on the cylinder.

14. The dispensing system of claim 11 wherein interlock projections are provided on interfacing surfaces of the neck and body.

15. The dispensing system of claim 11 wherein a rotational threshold force disengages the locking threads and the cooperating locking threads and a rotational releasing force releases and rotates the flexible fin out of the slot and wherein the fins and the slot are configured so that the rotational threshold force is greater than the rotational releasing force.

16. The dispensing system of claim 11 wherein the slot is defined by a ramp and an abutment, both disposed on the conically angled upper surface and with the ramp positioned to initially engage the flexible fin as the plunger is rotated into a locked down position.

17. The dispensing system of claim 11 wherein an audible click is produced as the fin flexes and engages the slot.

18. The dispensing system of claim 11 wherein the body insert includes one or more notches, with each notch spaced apart smooth conical landing surfaces, formed along a common circumference on an underside of the body insert and wherein the notches communicate with a vent opening when the locking threads and cooperating locking threads are not engaged.

19. The dispensing system of claim 11 wherein cylinder includes a flexible plug skirt coaxially configured to seal to an inner facing of the neck.

20. The dispensing system of claim 11 wherein at least one of the body insert and the cylinder include radial projections configured to stop rotation of the body insert relative to the cylinder when the radial projection(s) is engaged.

* * * * *